US009494136B1

(12) United States Patent
Edmiston

(10) Patent No.: US 9,494,136 B1
(45) Date of Patent: Nov. 15, 2016

(54) REFLEX CAMBER SURFACES FOR TURBINES

(71) Applicant: Daniel Edmiston, Columbia, MO (US)

(72) Inventor: Daniel Edmiston, Columbia, MO (US)

( * ) Notice: Subject to any disclaimer, the term of this patent is extended or adjusted under 35 U.S.C. 154(b) by 107 days.

(21) Appl. No.: 14/020,780

(22) Filed: Sep. 6, 2013

(51) Int. Cl.
*F03D 3/06* (2006.01)
*F03D 3/00* (2006.01)

(52) U.S. Cl.
CPC .............. *F03D 3/061* (2013.01); *F03D 3/005* (2013.01); *F05B 2240/213* (2013.01)

(58) Field of Classification Search
CPC .. F03D 3/061; F03D 3/005; F05B 2240/213; F05B 2240/301; Y02E 10/74
USPC .......................................... 416/197 A, 197 R
See application file for complete search history.

(56) References Cited

U.S. PATENT DOCUMENTS

| 4,005,947 | A | * | 2/1977 | Norton | F03D 3/007 416/197 A |
| 4,156,580 | A | * | 5/1979 | Pohl | F03D 3/02 290/55 |
| 4,359,311 | A | * | 11/1982 | Benesh | F03D 3/061 416/197 A |
| 5,494,407 | A | | 2/1996 | Benesh | |
| 7,314,346 | B2 | * | 1/2008 | Vanderhye | F03D 3/061 415/4.2 |
| 7,344,353 | B2 | * | 3/2008 | Naskali | F03D 3/04 415/4.2 |
| 7,744,338 | B2 | * | 6/2010 | DeRuyter | F03D 3/0454 415/2.1 |
| 2009/0160196 | A1 | * | 6/2009 | Metzloff | F03D 3/005 290/55 |
| 2010/0104441 | A1 | * | 4/2010 | Manley | F03D 3/065 416/200 R |
| 2011/0097200 | A1 | * | 4/2011 | Tai | F03D 3/02 415/199.3 |
| 2013/0069372 | A1 | * | 3/2013 | Ferguson | F03B 7/003 290/54 |
| 2015/0285219 | A1 | * | 10/2015 | Behrens | F03D 3/0409 415/115 |

FOREIGN PATENT DOCUMENTS

| CA | WO 2013029183 A1 | * | 3/2013 | ............ F03D 3/061 |
| DE | 102011113280 A1 | * | 3/2013 | ............ F03D 3/061 |

OTHER PUBLICATIONS

Edwin Lenz Len3 2 Turbine w.w.w.windstuffnow.com/main/len32_Turbine.

* cited by examiner

*Primary Examiner* — Joshua Kennedy

(57) ABSTRACT

A turbine rotor assembly having a rotor core formed by three reflex camber surfaces disposed symmetrically about an axis, each reflex camber surface being identical and having an aerodynamic shape producing positive torque through a large portion of its upwind travel while rotating about the axis. The trailing edge of each reflex camber surface joined to the leading edge of the adjacent reflex camber surface creating an envelope shielding the rotor core from the fluid driving the rotor.

4 Claims, 18 Drawing Sheets

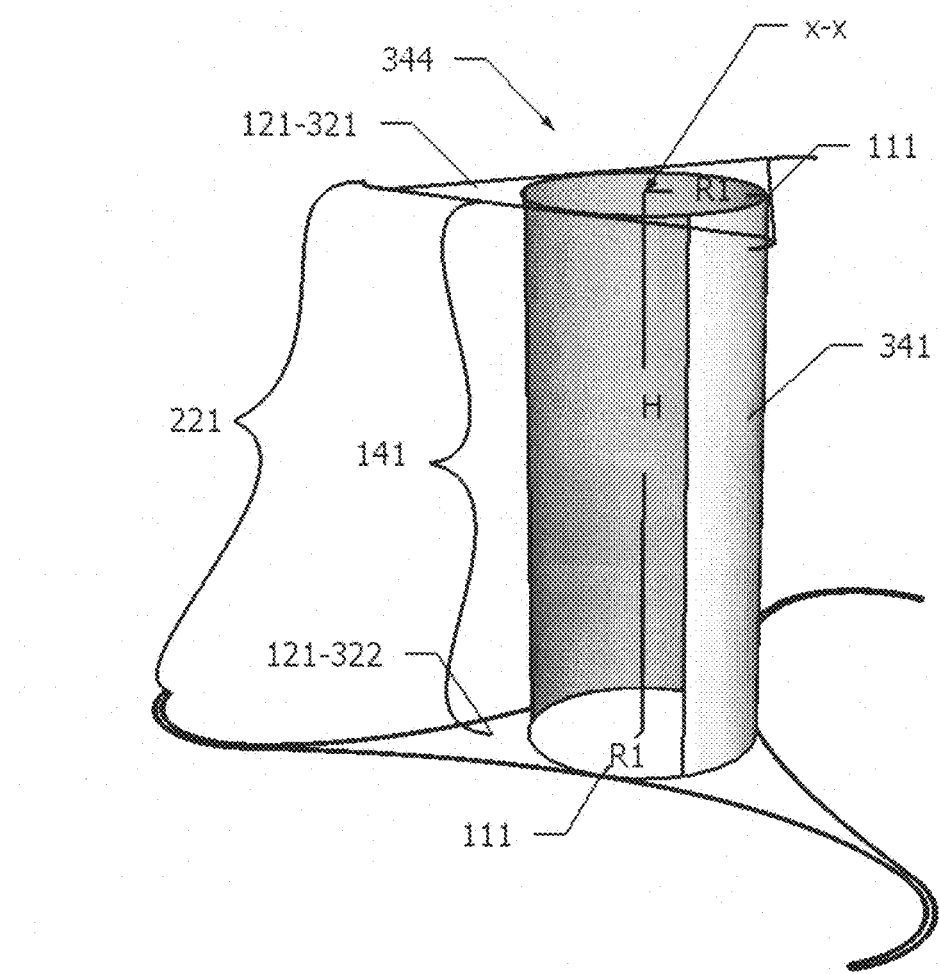

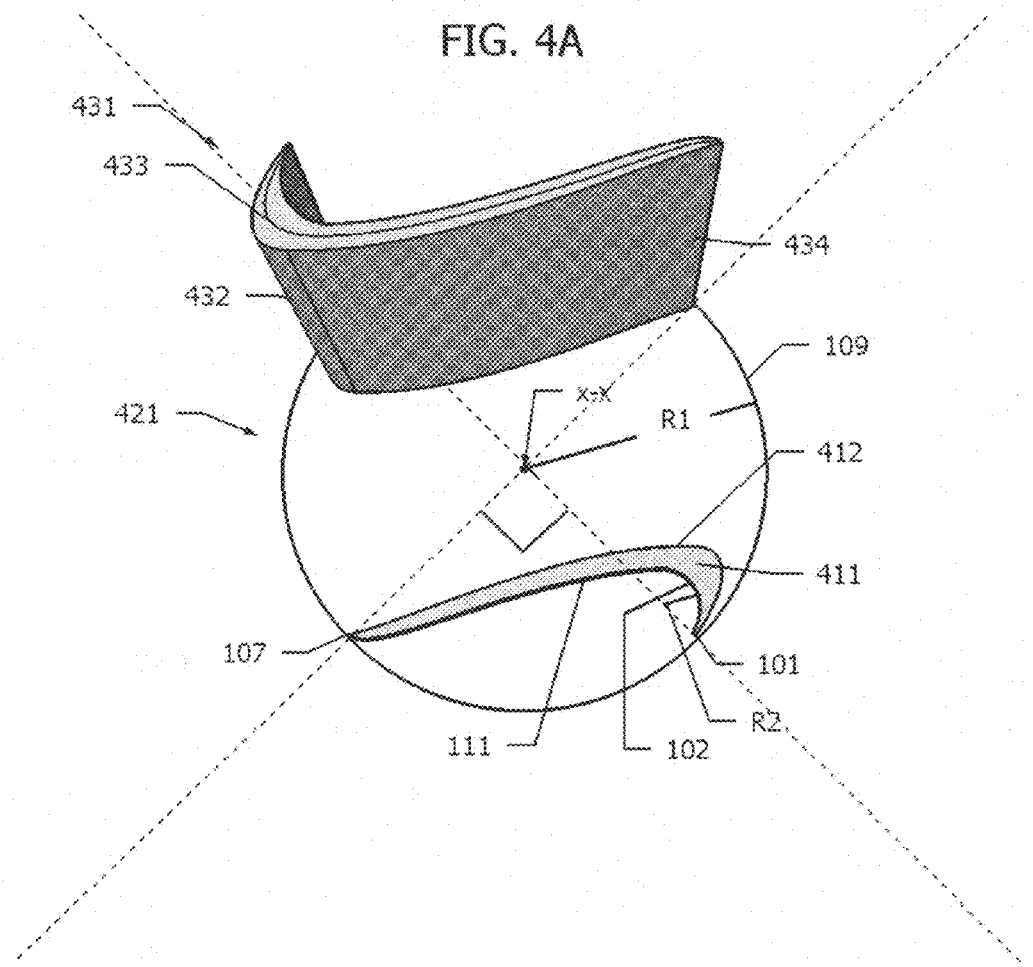

REFLEX CAMBER SURFACES FOR TURBINES

CROSS-REFERENCE TO RELATED APPLICATIONS

This application claims the benefit of provisional patent application Ser. Nos. 61/743,536, 61/743,537 and 61/743,538 each filed 2012 Sep. 6 by the present inventor.

FEDERALLY SPONSORED RESEARCH

Not Applicable

SEQUENCE LISTING OR PROGRAM

Not Applicable

BACKGROUND

Field

This application pertains to vertical axis wind turbines, specifically those with rotors having an unbroken perimeter formed by three reflex camber surfaces, enveloping a rotor core.

Prior Art

Three types of vertical axis wind turbines are well known, each of which with many variations:

1. Drag powered turbines such as anemometers which have a rotor made up of cupped or curved shaped elements, mounted around a central shaft. The cupped or curved elements create more drag from the wind from one direction than from the opposite direction. The difference in drag on one half of the rotor from the other half of the rotor causes the rotor to spin in the wind.

2. Darrieus type turbines which use airfoil shaped blades, or wings, are typically the most efficient of the vertical axis wind turbines.

3. Savonius type turbines have curved blades that bypass each other near the center axis. Savonius wind turbines are not generally thought of as airfoil turbines. However, with efficiencies improving as development continues, it is apparent that they are capable of being more than just drag powered turbines. The Savonius rotor assembly of U.S. Pat. No. 5,494,407 shows improved performance over earlier models although problems with supporting large thin blades still remain a challenge. Pulsating power requires heavy bracing. Large top and bottom plates are required for blade attachment and add unwanted drag.

When the Savonius rotor of U.S. Pat. No. 5,494,407 is viewed as a single airfoil it can be described as a vented reflex airfoil with camber reversing on each side of the axis.

SUMMARY

The following describes a turbine rotor assembly with a rotor having an unbroken perimeter formed by three reflex camber surfaces, each reflex camber surface having an aerodynamic shape for improved efficiency. The three reflex camber surfaces are joined end to end forming a shielded rotor core. Within the shielded core, bearings, supports, bracing, and other elements of the rotor assembly may be placed out of the flow of the driving fluid, thereby eliminating undesired drag and turbulence which would otherwise be created by those elements.

BRIEF DESCRIPTION OF THE DRAWINGS

In the drawings, closely related figures have the same number with a suffix (') or (") added to denote it as a separate part.

FIG. 3 illustrates a cylinder within a rotor core.

FIGS. 4A and 4B illustrate a two bladed vertical axis wind turbine.

DRAWINGS

Reference Numerals

Figure 1A:
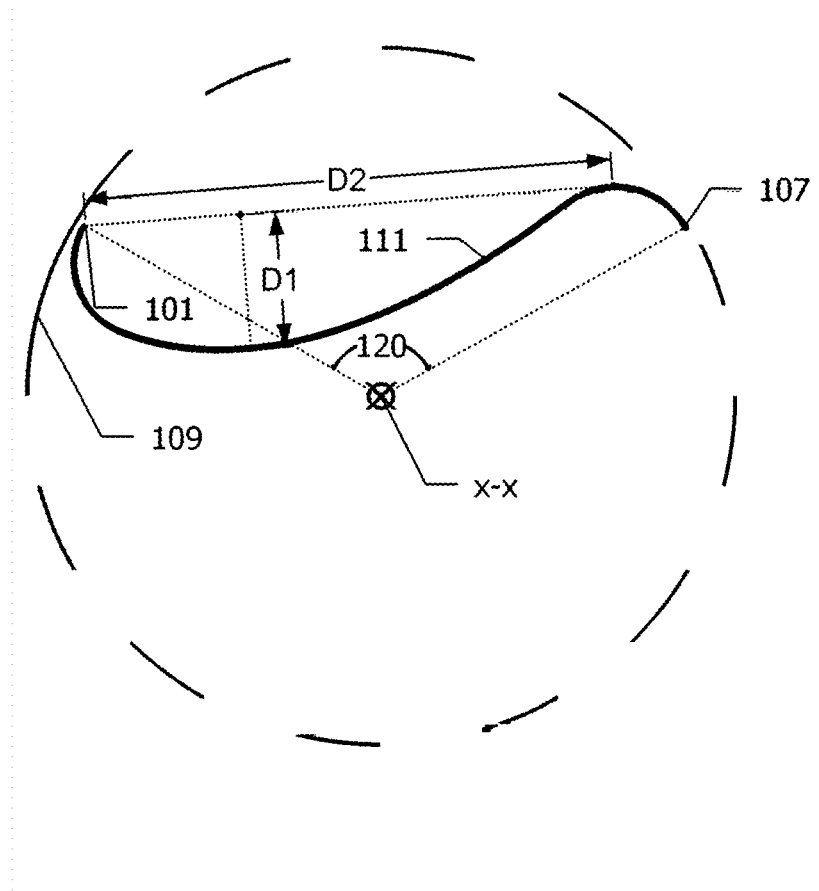
FIGS. 1A to 1E illustrate various aspects of a vertical axis wind turbine rotor having an unbroken perimeter formed by three reflex camber surfaces.

D1 Chord height
D2 Chord length
101 Leading end point
102 Leading segment
103 First transition point
104 Center segment
105 Second transition point
106 Trailing segment
107 Trailing end point
109 Outside circle
111 Reflex curve
115 Leading arc circle center
116 Reference line
117 Trailing arc circle center
118 Gap
121 Rotor profile
131 Reflex camber surface
141 Rotor core
142 Support with bearing means
144 Rotor
150 Rotor assemble
606 Front plate
607 Outside diameter
608 Back plate
611 Reflex blade profile
621 Rotor profile
631 Reflex blade
642 Shaft
650 Impeller

DETAILED DESCRIPTION

FIG. 1A to FIG. 1E—First Embodiment

FIG. 1A illustrates a reflex curve 111 used to define one of the outer reflex camber surfaces of a vertical axis wind turbine.

FIG. 1A further illustrates the reflex curve 111, having a leading end point 101 and a trailing end point 107, and their relation to an axis x-x and an outside circle 109. The outside circle 109 indicates the path that trailing end point 107 follows as it rotates about the axis x-x. The leading end point 101, the trailing end point 107, and a vertex on the axis x-x form a 120 degree angle.

D1 is the distance of the draft, rise, offset, or chord height of the reflex curve 111, measured perpendicular to the chord of the reflex curve 111. D2 is the distance of the chord of the reflex curve 111. The chord is defined by a line segment beginning at the leading end point 101 and ending at the point where the line segment is tangent to the opposite bend of the reflex curve 111. The reflex curve 111 has a measurable amount of bend or camber defined by D1/D2.

Figure 1B:
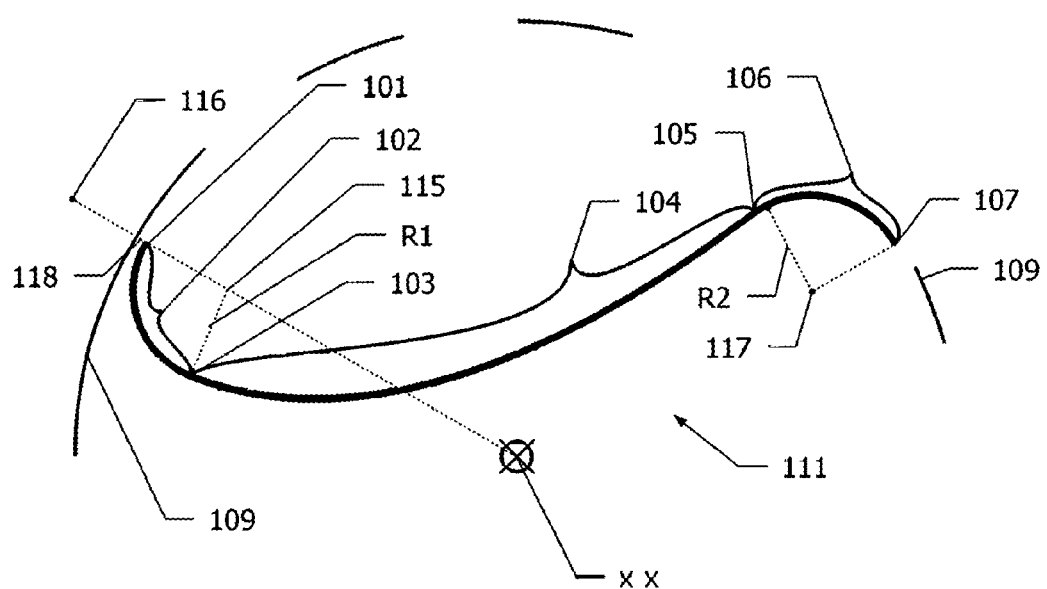

FIG. 1B illustrates the reflex curve 111 as three individual curves, a leading curve 102, a center curve 104, and a trailing curve 106. Reference points are included to illustrate placement of the curves 102, 104, and 106 in relation to each other, the axis x-x, and the outer circle 109. The following describes the reflex curve 111 from left to right:

The leading end point 101 is located, the distance of a gap 118, inside the outer circle 109. At the leading end point 101 the leading curve 102 begins, curving toward the axis x-x, following a circular arc having a leading radius R1 defining a leading arc circle center 115. The leading end point 101 is located on a reference line 116 passing through the axis x-x and the leading arc circle center 115.

A first transition point 103, of the reflex curve 111, is the point where the reflex curve 111 first has a radius greater than the leading radius R1, defining the beginning of the center curve 104. The center curve 104 is an increasing-radius curve, tangent to the leading curve 102 at the first transition point 103, curving the same direction as the leading curve 102 and passing between the axis x-x and the leading end point 101.

A second transition point 105, of the reflex curve 111, is the point where the reflex curve 111 begins to bend the opposite direction of the leading curve 102. This defines the beginning of the trailing curve 106. The beginning of the trailing curve 106 is tangent to the center curve 104 at the second transition point 105. A substantial portion of the trailing curve 106 follows an arc having a trailing radius R2 defining a trailing arc circle center 117. The trailing curve 106 follows the arc until reaching the outside circle 109 at the trailing end point 107.

Figure 1C:
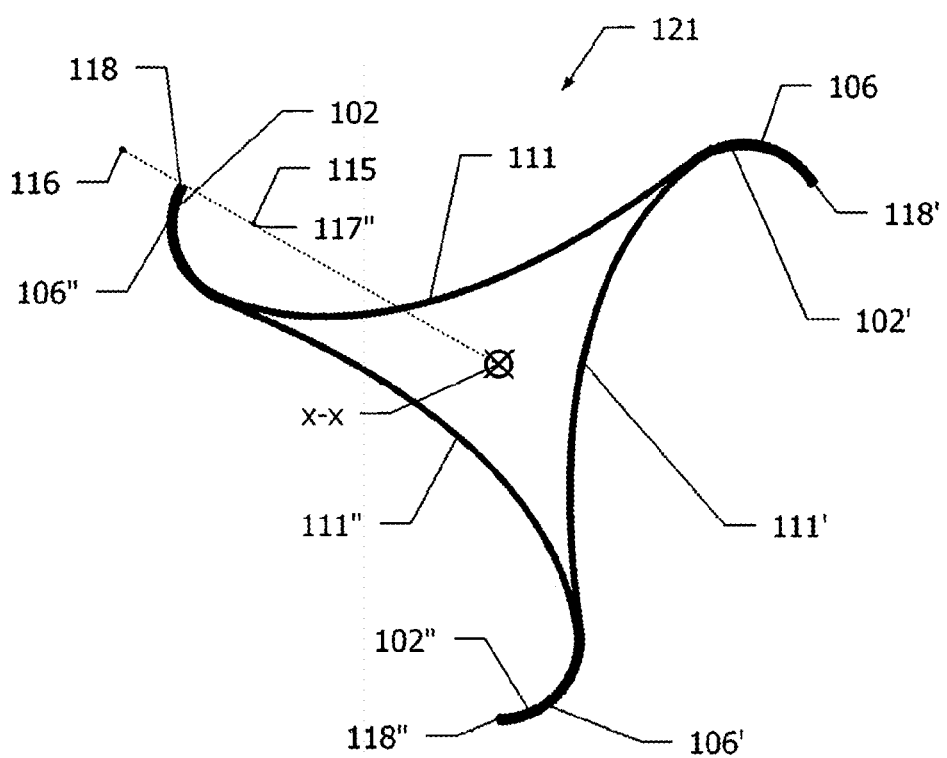

FIG. 1C illustrates a rotor profile 121 showing the first reflex curves 111, a second reflex curve 111', and a third reflex curve 111" with corresponding leading curves 102, 102', 102", trailing curves 106, 106', 106", and gaps 118, 118', and 118". Reflex curve 111' is identical to reflex curve 111 and is rotated 120 degrees clockwise about the axis from the position of reflex curve 111. Reflex curve 111" is identical to reflex curve 111 and is rotated 120 degrees counterclockwise from the position of reflex curve 111.

The trailing curve 106", of the third reflex curve 111", has a trailing arc circle center 117". The trailing arc circle center 117" shares the same point as the leading arc circle center 115 of the leading curve 102 of the first reflex curve 111. The leading curve 102 is nested concentrically inside of the trailing curve 106".

The adjacent ends of the first reflex curve 111 and the third reflex curve 111", forming the gap 118, fall on the reference line 116 that passes through the axis x-x and the point shared by the leading arc circle center 115 and the trailing arc circle center 117".

Adjacent ends of reflex curves 111 and 111' forms gap 118' and adjacent ends of reflex curves 111' and 111" forms gap 118".

Figure 1D:
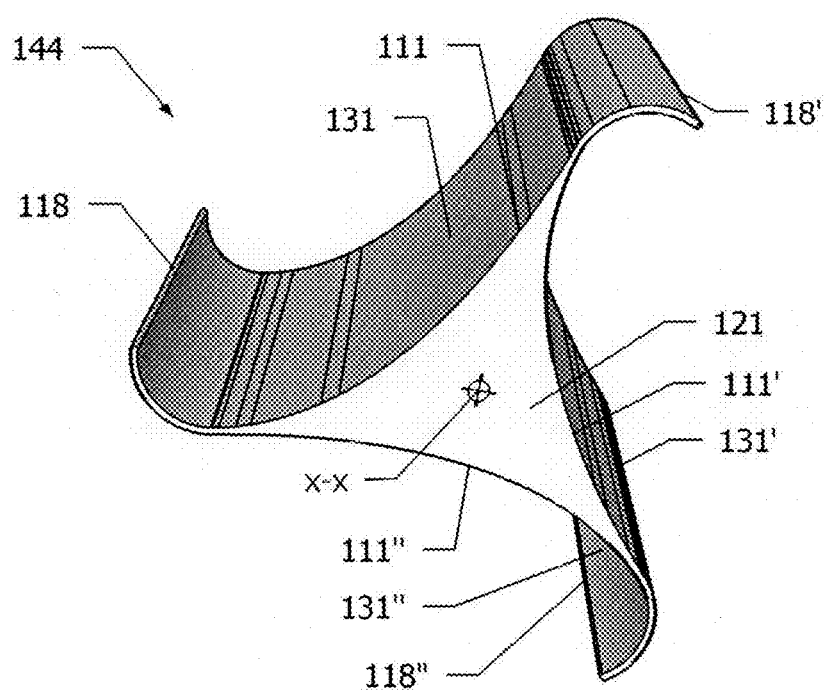

FIG. 1D illustrates a rotor 144 having a first reflex camber surface 131, a second reflex camber surface 131', and a third reflex camber surface 131". Each reflex camber surface 131, 131', and 131" is formed from a single sheet of material having a thickness one half the width of the [gap 118] gap 118. Each sheet of material is mounted surrounding the axis such that each reflex camber surface 131, 131', and 131" is following the corresponding reflex curves 111, 111', and 111" of the rotor profile 121. The gaps 118, 118', and 118" are filled by the thickness of the sheets of material that form the rotor 144 thereby creating an unbroken perimeter surrounding the rotor 144.

Figure 1E:
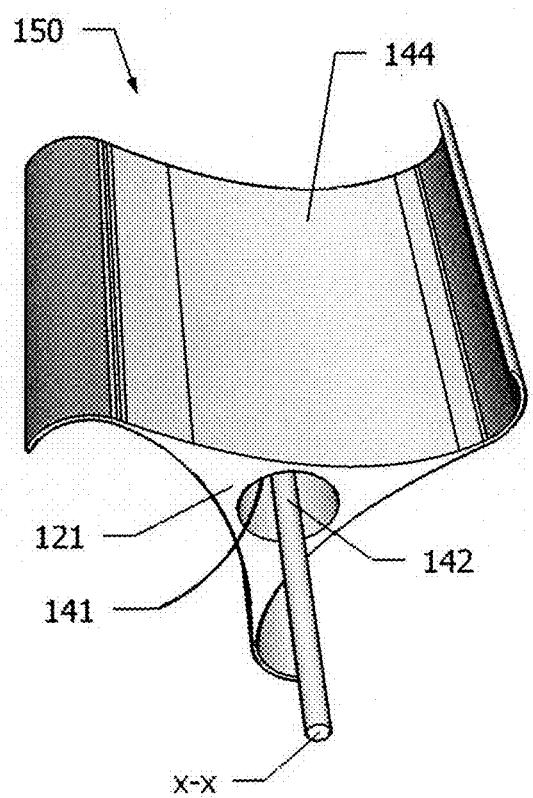

FIG. 1E illustrates a bottom view of a rotor assemble 150 with the rotor 144 having a rotor core 141 formed inside rotor profile 121. Within the rotor core 141 a support with bearing means 142 is provided to allow rotation of the rotor 144 about the axis x-x.

OPERATION

FIG. 1A to FIG. 1E—First Embodiment

The turbine rotor 144 having a first, a second, and a third reflex camber surface 131 disposed symmetrically about the rotor axis x-x, each reflex camber surface 131 being identical and having an aerodynamic shape producing positive torque through a large potion of its upwind travel while rotating about the axis x-x. The trailing edge of each reflex camber surface 131 is joined to the leading edge of the adjacent reflex camber surface 131 thereby enveloping the rotor core 141.

Within the rotor core 141, bearings, supports, bracing, or other elements of the turbine assembly may be placed to be out of the flow of the driving fluid, thereby eliminating undesired drag and turbulence which those elements would otherwise create, and protecting those elements from debris that may be carried by the flowing fluid.

This combination provides for increased durability and efficiency, of the turbine rotor assembly.

CONCLUSIONS, RAMIFICATIONS, and SCOPE

The above embodiment describes a turbine rotor assembly of a vertical axis wind turbine. As with other wind turbines many other variations are possible. The invention can be scaled in size for powering a variety of applications from anemometers, to kinetic art, to electrical generators. The turbine characteristics also make it a candidate for hydrokinetic application.

The scope should not be determined by the embodiment illustrated, but by the appended claims.

DETAILED DESCRIPTION

FIG. 2A to FIG. 2D—Second Embodiment

Figure 2A:
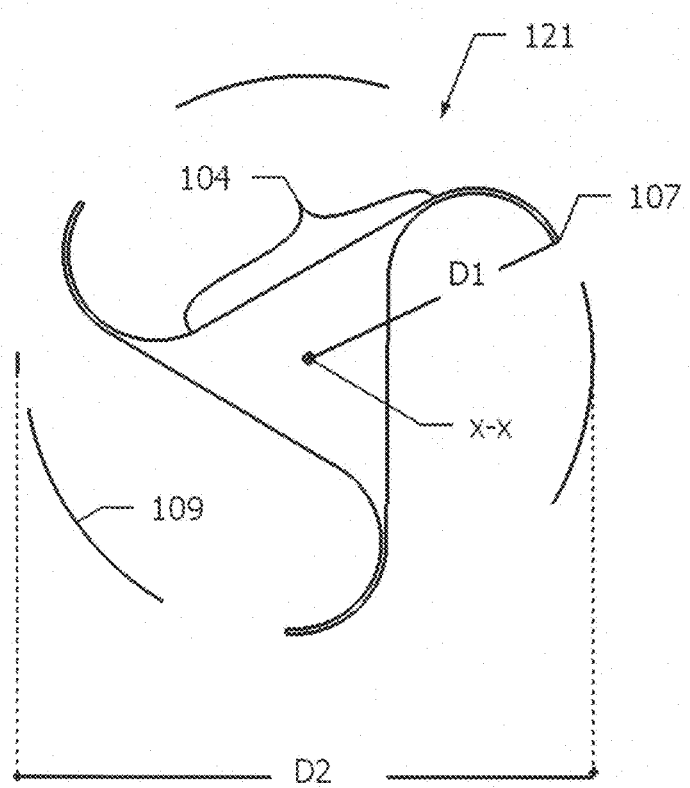
FIGS. 2A to 2D illustrate features of a spherically shaped three airfoil vertical axis wind turbine.

FIG. 2A illustrates a rotor profile 121 where the center segments 104 are linear. The distance from the axis to the trailing end point 107 is measured as D1. The circle 109 defined by the rotation of the trailing end point 107 about the axis has a diameter D2 being twice the distance of D1.

Figure 2B:
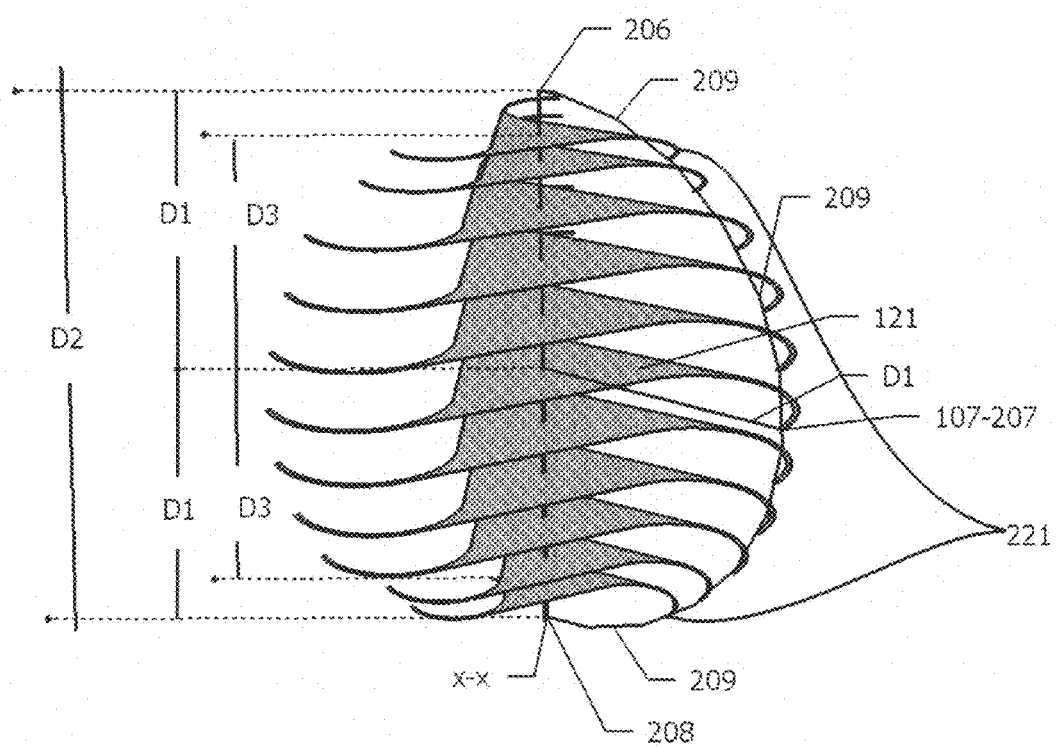

FIG. 2B illustrates an array of rotor profiles 221. Each rotor profile 121 is perpendicular to and symmetrically centered on the axis. The largest rotor profile 121 within the array 221 is centered in the array 221 and has a distance from its axis to its trailing end point 107 measuring D1. A half circle arc 209 with end points on the axis, is defined by having and top end point 206 a distance of D1 above the center rotor profile's 121 axis, a bottom end point 208 a distance of D1 bellow the center rotor profile's 121 axis, and an arc center point 207 located on the array's 221 largest rotor profile's 121 trailing end point 107.

The array 221 extends a distance along the axis, measuring D3, above the center rotor profile 121. The array 221 also extends a distance along the axis, measuring D3, below the center profile 121. The distance D3 being 90% of the distance D1.

Each rotor profile 121 in the array 221 is scaled in size such that the half circle arc 209 passes through each rotor profile's 121 trailing end point 107.

Figure 2C:
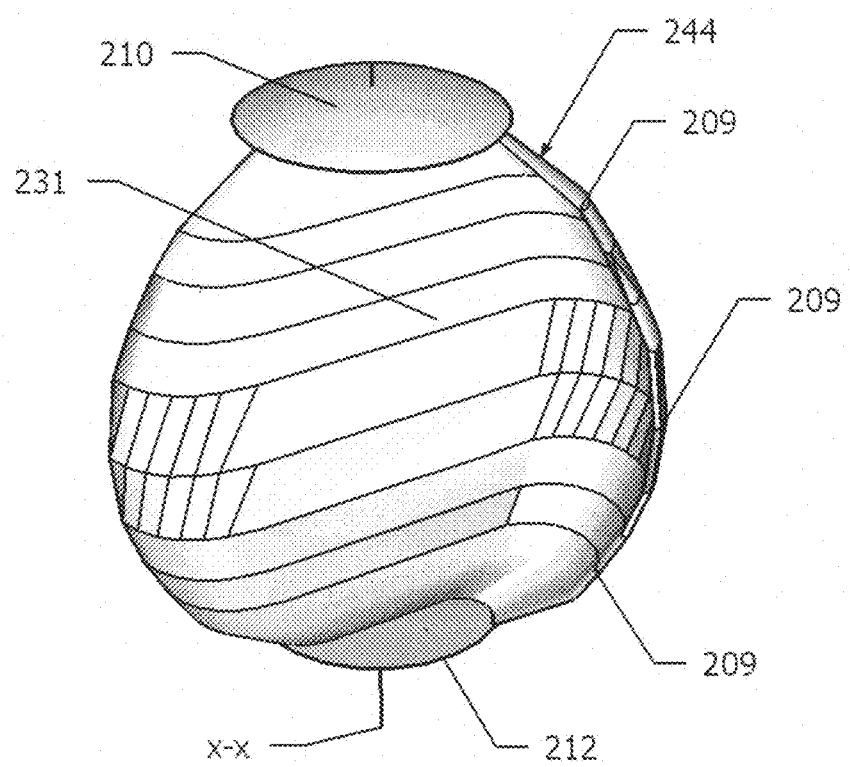

FIG. 2C illustrates a rotor 244 with a view showing one reflex airfoil 231 with a shape derived from the array 221 illustrated in FIG. 2B. A top attachment means 210 and a bottom attachment means 212 are centered on the axis and domed to match the half circle arc 209.

Figure 2D:
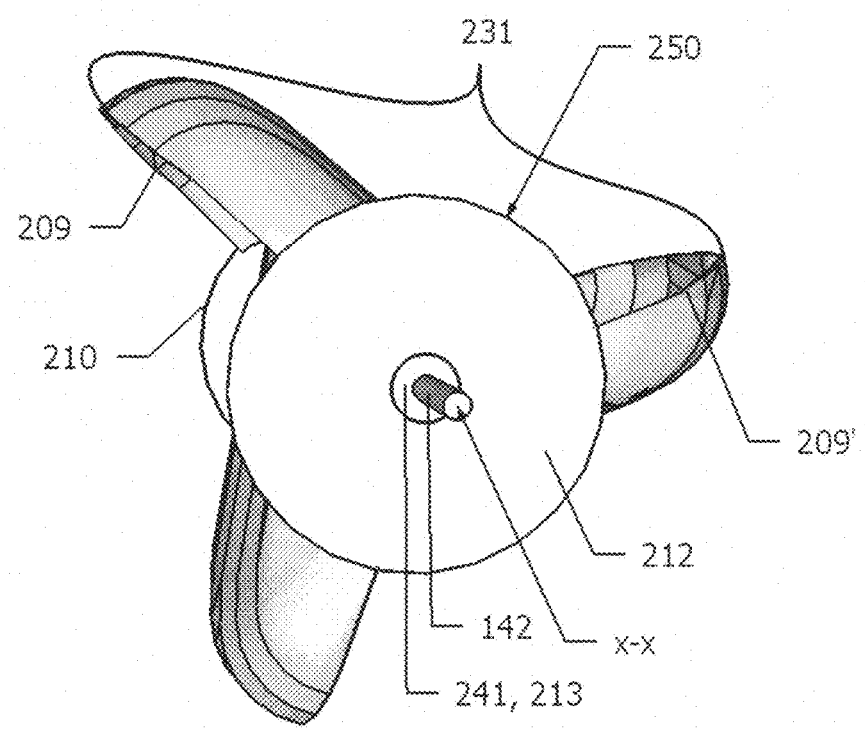

FIG. 2D illustrates a bottom view of the rotor assembly 250 giving another perspective of the reflex airfoil 231 and its relation to the half circle arcs 209 and 209'. The half circle arc 209 is shown tying into the edge of the top attachment means 210 and bottom attachment means 212. The bottom attachment means 212 has an opening 213 to provide access to the rotor core 241 for mounting the support with bearings means 142.

OPERATION

FIG. 2A to 2D—Second Embodiment

This embodiment is for a vertical axis wind turbine with the advantage of maintaining the shape of thin reflex airfoils 231, during high speed operation, through tension loads along the half circle arcs 209 eliminating the need for large end caps and drag inducing bracing.

This advantage allows for a lighter rotor with less rotational inertia than rotors with large end caps, giving this embodiment the desired effect of quicker response times to changes in wind speed.

DETAILED DESCRIPTION

FIG. 3—Third Embodiment

FIG. 3 illustrates a rotor section 344 having an array of rotor profiles 221 along the axis with a height measured as H. The array defines a rotor core 141. Within the rotor core 141 is a minimum radius cylinder 341 defined by the height of the array 221-H and the minimum distance R1 between the axis and the nearest point to any reflex curve 111 within the array 221.

All rotor profiles with in the array 221 from the smallest rotor profile 321 to the largest rotor profile 322 are shaped such that each have the same minimum distance R1 between their axis and nearest point on their reflex curves.

OPERATION

FIG. 3—Third Embodiment

The largest rotor profile 322 of this embodiment is designed with smoothed curved lines for rotor section 344 to operate at maximum efficiency. The smallest rotor profile 321, still capable of producing torque, has a much larger minimum distance R1 in relation to its size than the largest rotor profile 322. This arrangement provides addition access space to the center of the rotor core 141 than would normally be provided if all rotor profiles 121 were scaled copies of the largest rotor profile 322.

DETAILED DESCRIPTION

Figure 4B:
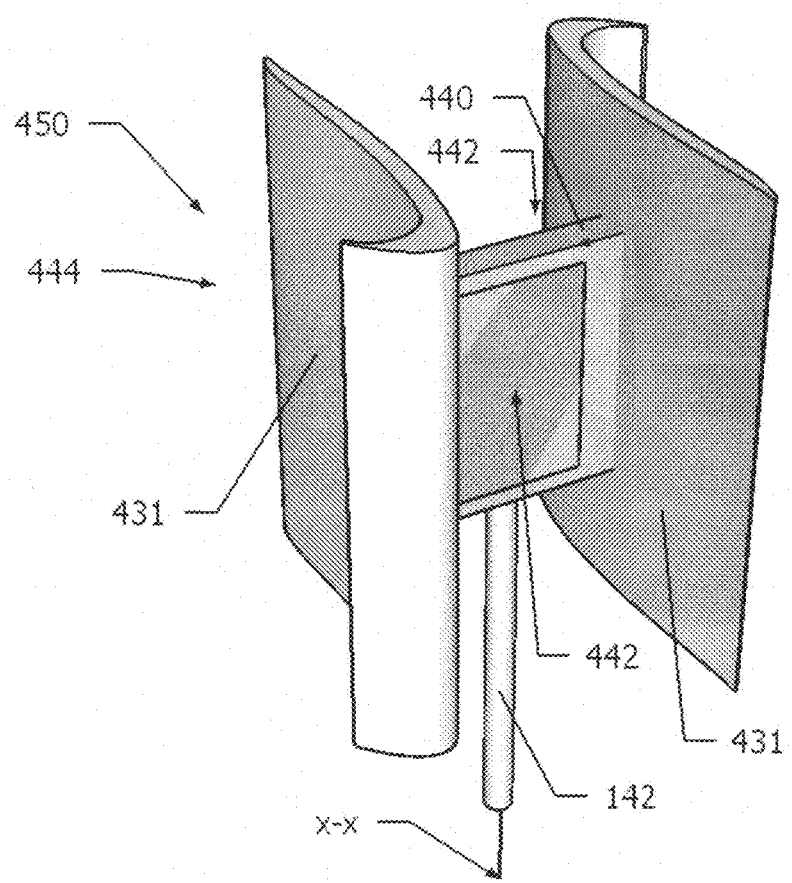

FIG. 4A and FIG. 4B—Fourth Embodiment

FIG. 4A illustrates a rotor profile 421 with two reflex airfoil profiles 411, with one reflex airfoil 411 being extruded to form a reflex airfoil 431. The reflex airfoil 431 has a leading edge 432, a trailing edge 434, and a mean camber line 433.

The reflex airfoil profile 411 is defined by two curved lines. The first curve is a reflex curve 111 being the outward of the two from the axis having a leading end point 101, a leading segment 102 and a trailing end point 107. The trailing end point 107 defines an outer circle 109 then rotated abut the axis x-x. The second curve is a streamlining inward curve 412 starting at the leading end point 101 of the reflex curve 111 and curving toward the axis, staying inside of the outside circle 109 continuing between the reflex curve 111 and the axis and ending at the trailing end point 107. The reflex airfoil profile 411 is relatively thin except for a thicker portion ahead of the reflex curve's 111 leading segment 102 where the streamlining inward curve 412 is more arched in shape than the leading segment 102.

The rotor profile 421 shows the relation of two reflex airfoil profiles 411 to each other and to the axis. Each leading end point 101 is 90 degrees, measured from the axis, from its own trailing end point 107 and 90 degrees, measured at the axis, from the other profiles 431 trailing end point 107.

With the leading segment having a radius of R1 and the outer circle having a radius of R2, The ratio of R1 to R2 is 1 to 6.

FIG. 4B illustrates a rotor assembly 450 with two reflex airfoils 431 following the rotor profile 421 of FIG. 4A.

A rotor brace 440 passing through the axis, bridges between the two reflex airfoils 431 and attaches to the reflex airfoils 431 at points where they are nearest the axis. The rotor brace 440 maintains the position of the reflex airfoils 431 within the rotor 444 while providing an attachment area for a support with bearing means 142. The rotor brace 440 also provides two flat surfaces between the airfoils 431 for an image display area 445.

OPERATION

FIG. 4A and FIG. 4B—Fourth Embodiment

This embodiment is shown as a small wind driven image display. The image display area 442 is located between the two airfoils 431 near the axis of the rotor 444. As the rotor 444 spins the reflex airfoils 431 block the view of the image display area 442 as it revolves away from the ideal viewing angle. When spinning, this blocking provides a stroboscopic effect such that the image display area 442 appears less blurred than if no blocking occurred when viewing from any angle around the rotor 444.

DETAILED DESCRIPTION

Figure 5A:
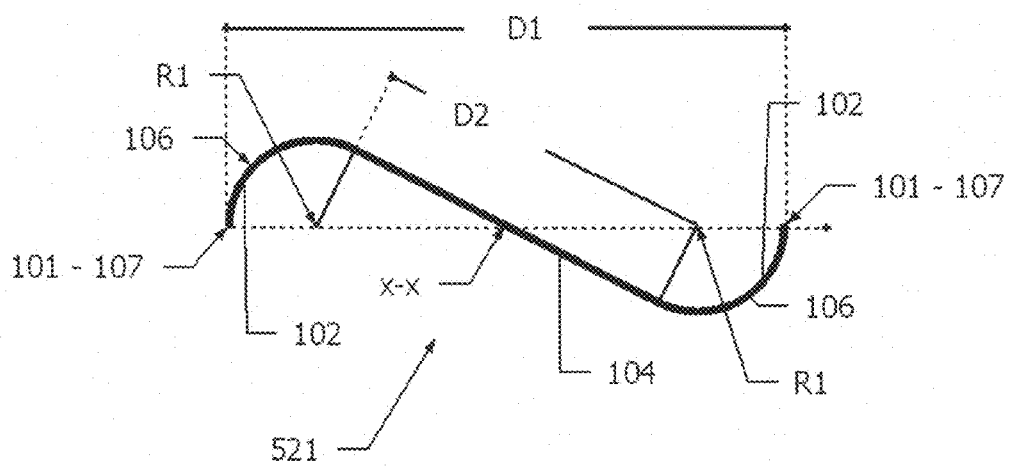
FIGS. 5A to 5C illustrate a rotor assembly with several rotors.
Figure 5B:
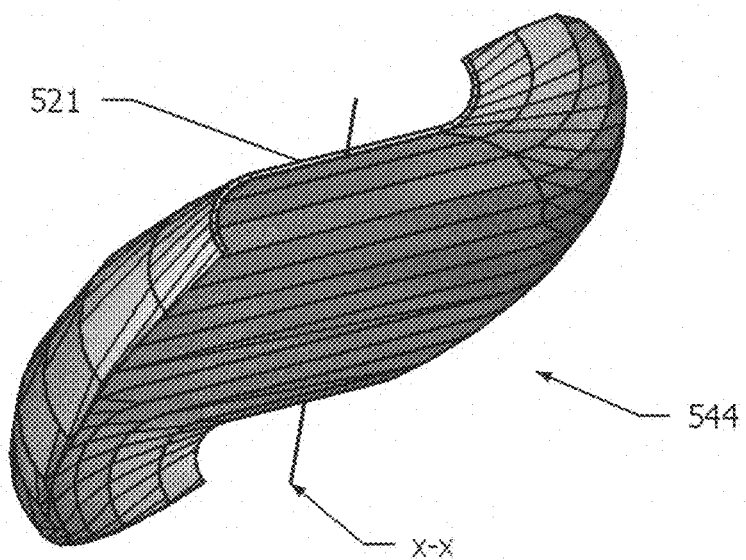
Figure 5C:
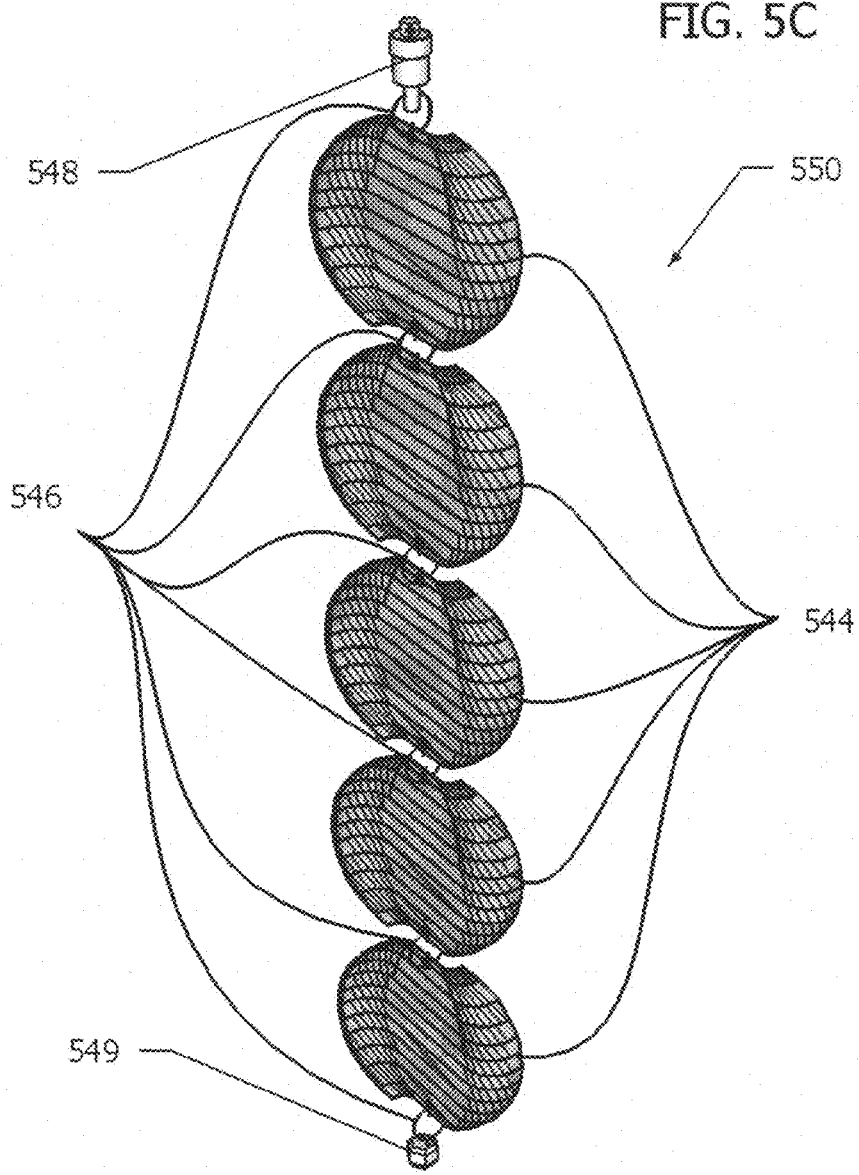

FIG. 5A to FIG. 5C—Fifth Embodiment

FIG. 5A illustrates a rotor profile 521 with two identical reflex curves 111, 180 degrees out of rotation from each other, with a uniform distance between them. The leading end point 101 of one reflex curve 111 is the trailing end point 107 of the other curve 111. The center segment 104 is linear and has a distance measured as D2. The radius of the trailing segment 106 has a radius R1 and the distance measured between trailing end points 107-107 is D1.

The center segment's 104 distance D2=D1×0.60

The trailing segment's 106 radius R1=D1×0.15

FIG. 5B Illustrates a rotor 544 formed from a disc shaped piece of sheet material. The rotor profile 521 is visible at the top of the rotor.

FIG. 5C illustrates a rotor assembly 550 constructed with five rotors 544 that are linked together with flexible coupling 546. Each flexible coupling 546 is in the form of a split ring passing though eyelets placed near the bottom and top of the rotor 544. A weight at the bottom of the rotor assembly 550 acts as a stabilizer 549 for windy conditions. A swivel bearing 548 is attached at the top of the top rotor 544 with another flexible coupling 546 to allow rotation.

OPERATION

FIG. 5A to FIG. 5C—Fifth Embodiment

This embodiment is shown as a wind driven decorative or advertising accent where colors, logos, or other images are to be displayed in an attention getting manner.

DETAILED DESCRIPTION

Figure 6A:
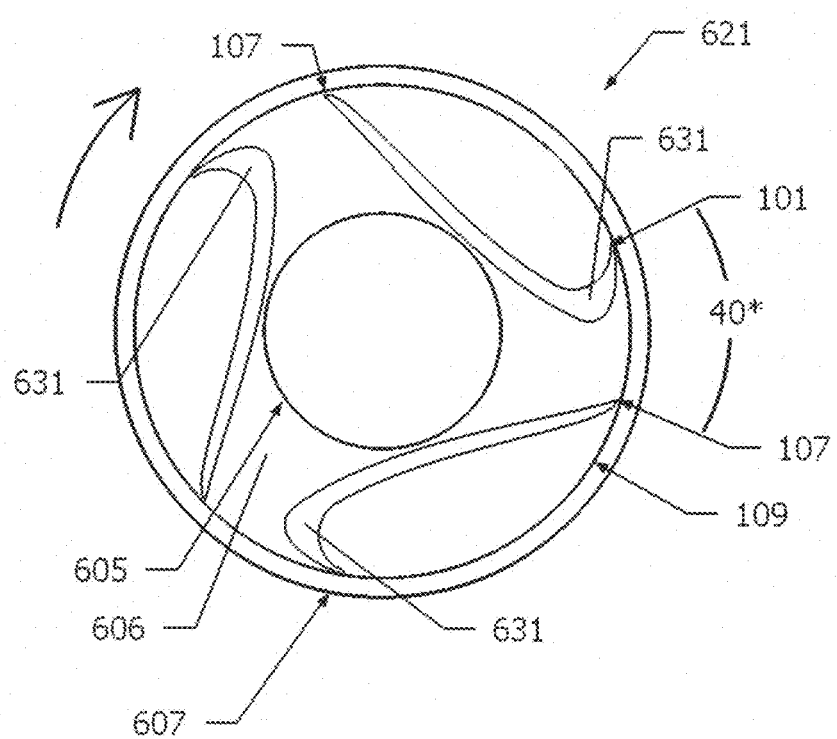
FIGS. 6A and 6B illustrate a centrifugal blower impeller.
Figure 6B:
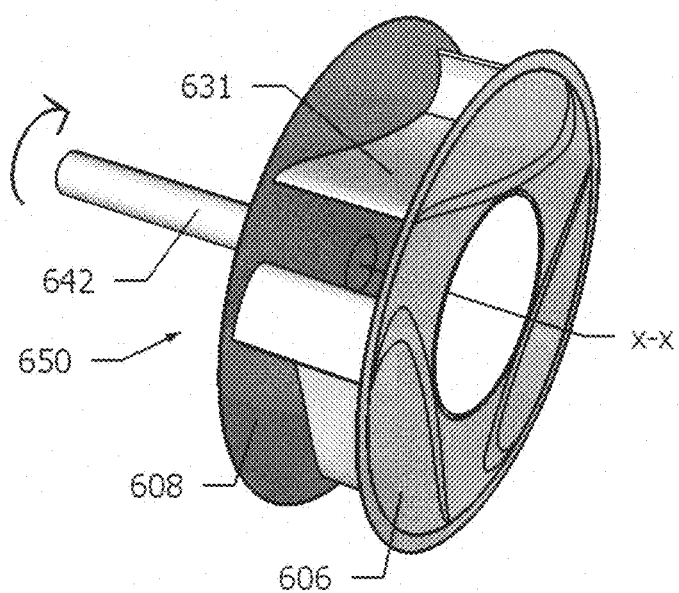

FIG. 6A and FIG. 6B—Sixth Embodiment

FIG. 6A illustrates a centrifugal blower's impeller rotor profile 621 with three identical reflex blade profiles 611, similar in shape to the reflex airfoil profile 411 in FIG. 4A, spaced evenly around the axis. Each reflex airfoil profile has a leading end point 101 and a trailing end point 107. A circle 109, defined by the path that trailing end points 107 follows when rotated about the axis x-x, is also shown. The reflex airfoil profiles 611 are spaced such that each leading end point 101 and each trailing end point 107 of the adjacent reflex blade profile 611 are spaced, 40 degrees apart, along the outside circle 109. The points on the reflex blade profile 611 closest to the axis, when rotated about the axis, define an inlet diameter 605.

FIG. 6B illustrates an impeller 650 including a shaft 642 to drive it, a back plate 608 supporting three reflex blades 631, and the front plate 606. The back plate has a diameter slightly larger than the outside circle 109. The front plate has an outside diameter slightly larger than the out side circle 109, and an inside diameter equal to or slightly smaller than the inlet diameter 605.

OPERATION

FIG. 6A and FIG. 6B

The impeller 650 is for use in a centrifugal blower where blower stability is needed under low flow, high back pressure conditions.

DETAILED DESCRIPTION

Figure 7A:
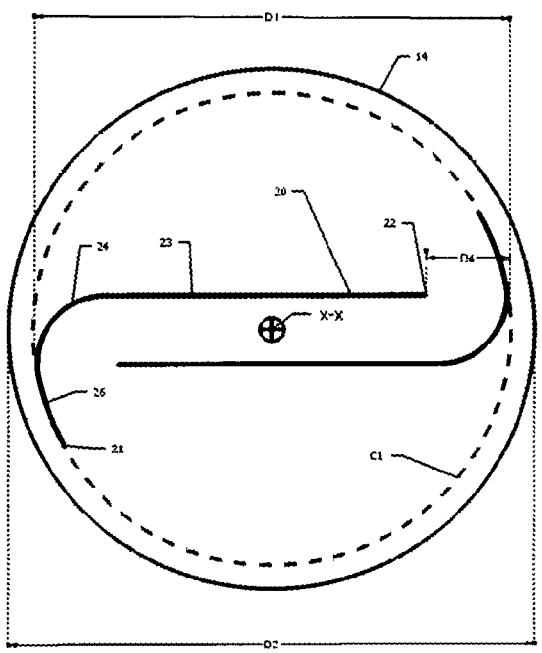
FIGS. 7A and 7B illustrate prior art and modification.
Figure 7B:
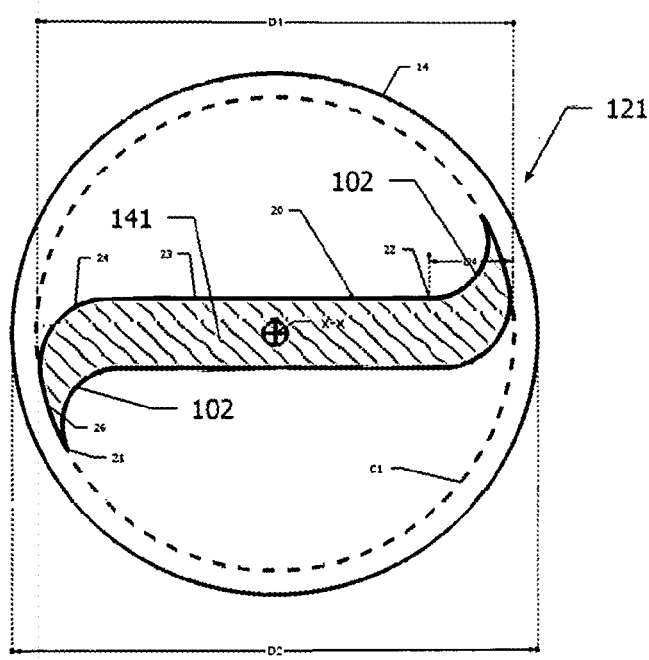

FIG. 7A and FIG. 7B—Seventh Embodiment

FIG. 7A illustrates prior art from U.S. Pat. No. 5,494,407, for a Savonius rotor assembly.

FIG. 7B illustrates a rotor profile 121 using the same dimensions as the Savonius rotor and adding two leading segments 102 filling the gap between the two blades.

OPERATION

FIG. 7A and FIG. 7B Seventh Embodiment

The added leading segments 102 provide a rotor core 141 shielded from the wind where bracing may be added without disturbing airflow.

The invention claimed is:

1. A turbine rotor assembly, driven about an axis by fluid flowing perpendicular to said axis, said assembly comprising:

a support and bearing means;

a rotor, having a shielded core, mounted to said support and bearing means for rotation about said axis, having a height measured along the axis, and a shape defined by:

a plurality of rotor profiles disposed along the axis the distance of said height, with each said rotor profile being perpendicular to and symmetrically centered on the axis, each said rotor profile comprising:

said three reflex curves disposed at 120 degree intervals about the axis, none intersecting with another, their position defined by:

an outer circle, inscribed by the point(s) on said reflex curves most distant from the axis when said rotor profile is rotated about the axis, a leading arc circle center and a trailing arc circle center;

each said reflex curve comprising:

a leading curve, a center curve, a trailing curve, and a small joining link, said leading curve following a leading arc of a circle defining said leading arc circle center, beginning at a leading end point curving towards the axis continuing to a point where said reflex curve's radius becomes larger than the radius of said leading curve, thereby defining the beginning of said center curve, being an increasing-radius curve, tangent to said leading curve, curving in the same direction as said leading curve, crossing between the axis and said leading end point, continuing to a point where said reflex curve bending the opposite direction of the arc of said leading curve defines the beginning of said trailing curve, said trailing curve being tangent to said center curve, continuing until reaching a trailing end point on said outer circle, said trailing curve following the arc of a circle at said trailing end point, defining said trailing arc circle center;

on each said rotor profile, each said trailing arc circle center shares the same point as said leading arc circle center of the adjacent corresponding said reflex curve's said leading curve, whereby, said leading curve of each said reflex curve is nested concentrically inside said trailing curve of the adjacent said reflex curve at said trailing end point, with each said small joining link, joining each said trailing end point to said leading end point of the adjoining said reflex curve, thereby each said rotor profile has a continuous unbroken perimeter wherein, each said reflex camber surface of said rotor, substantially following each said reflex curve of said rotor profiles, being joined to be forming said shielded core wherein said support and bearing means may be located, shielded from said flowing fluid.

2. A turbine rotor assembly in accordance with claim 1, wherein said reflex camber surface(s) has maximum camber between 20 and 30 percent.

3. A turbine rotor assembly in accordance with claim 1, wherein said rotor profiles are of equal size.

4. A turbine rotor assembly in accordance with claim 1, wherein said rotor profiles are of equal size and aligned rotationally along the axis.

* * * * *